Nov. 10, 1931.  C. O. PETERSEN  1,831,576
ANTISIDE SLIPPING ATTACHMENT
Filed Oct. 16, 1930
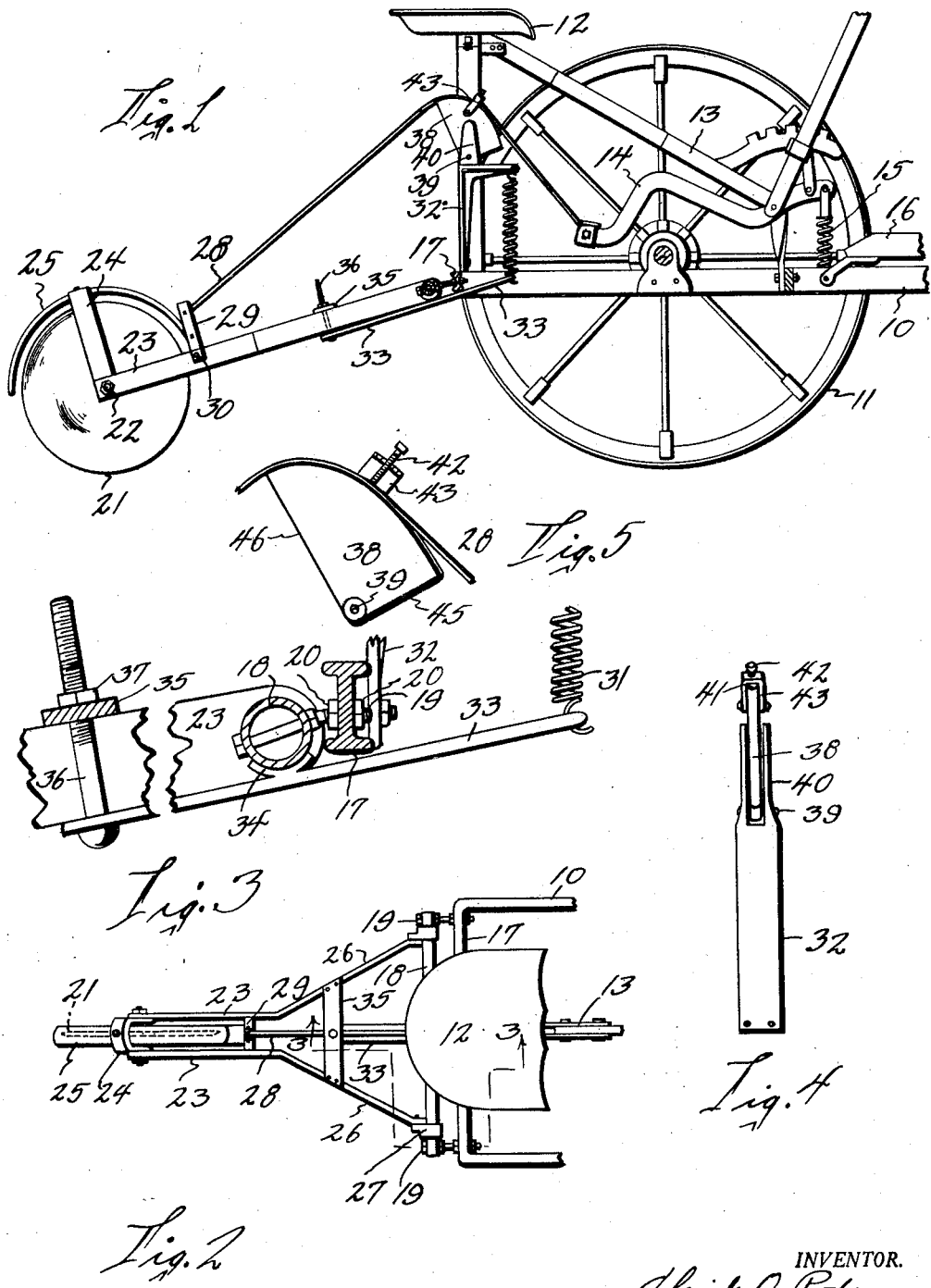
INVENTOR.
Christ O. Petersen
BY
Lynn H Latta
ATTORNEYS.

Patented Nov. 10, 1931

1,831,576

UNITED STATES PATENT OFFICE

CHRIST O. PETERSEN, OF ANTHON, IOWA

ANTI-SIDE SLIPPING ATTACHMENT

Application filed October 16, 1930. Serial No. 489,060.

My invention relates to attachments for preventing side slipping of farm machines, such as planters, when used on a side hill.

My invention relates more particularly to that type of device attachable to planters which is linked up with the planter shoe raising lever so that upon depressing of this lever the anti-slip device will be raised to an inoperative position.

An object of the present invention is to provide an attachment which can be attached entirely to the rear transverse frame member of the planter. In prior constructions of my own invention for instance, the apparatus was attached both to the rear frame member and also to the seat support.

A further object of the present invention is to provide mechanism for providing an adjustable tension on the ground engaging portion of the apparatus.

Another object of the present invention is to provide a simple device for multiplying the movement of the foot lever in such a way that the ground engaging member will be raised a greater distance than the foot lever is depressed.

A further object is to simplify and to cheapen prior constructions and to provide a compact unit which may be easily attached to a planter.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of a planter embodying my invention.

Fig. 2 is a plan view of the rear portion of the same.

Fig. 3 is a detail, sectional view taken on the line 3—3 of Fig. 2.

Fig. 4 is a rear elevation of the bracket portion of the attachment.

Fig. 5 is a detail view of the pulley sector.

I have used the reference character 10 to indicate generally the longitudinal frame of a planter having the wheels 11, the seat 12, the seat supporting structure 13, the planter shoe-raising foot lever 14, and the mechanism 15 connecting the lever 14 with a portion 16 of the forward part of the planter.

It will be understood that the mechanism just described is of a very common construction and that the depression of the foot lever 14 serves to raise the planter shoes from the ground, the shoes not being illustrated in connection with the present drawings.

A rear frame member 17 connects the side bars 10 of the planter frame and the attachment of my invention is secured to this rear cross-bar.

The attachment comprises a shaft 18 to which are secured a pair of studs 19, provided each with a pair of threaded nuts 20 by means of which the studs are secured to the cross-bar 17 of the planter frame. To this end, the studs are passed through suitable openings drilled in the cross-bar, and the drilling of these openings comprises the only alteration that is necessary in the planter itself.

The attachment comprises a flat, sharp-edged disc 21, journalled on a shaft 22, between the arms 23 of the attachment frame. The arms 23 are attached at the rear ends to a yoke 24 which also serves as a support for a guard 25.

The forward ends of the arms 23 are spread as at 26 and secured to bearings 27 which receive and are rotatably mounted upon the shaft 18.

A cable 28 is attached at one end to a yoke 29, which also serves to support one end of the guard 25, and which is secured as at 30 to the arms 23, and to its other end the cable 28 is attached to the foot lever 14.

The parts just described form part of my prior invention, and the present invention relates to the improvements thereon which will now be described.

For the purpose of resiliently urging the disc 21 downwardly, I provide a spring 31 attached at one end to a bracket 32 and at its other end to a lever 33.

The lever 33 is fulcrumed beneath the shaft 18 and for this purpose is provided with a saddle 34 which loosely engages the lower surface of the shaft 18.

The saddle 34 is held in engagement with the shaft by the pull of the spring 31.

The other end of the lever 33 is attached to a cross-arm 35 secured between the arms 26. A bolt 36 extends through the lever 33 and through the cross-arm 35 and is provided with a nut 37 threaded thereon and adjustable so as to vary the angular relation of the lever 33 to the movement plane of the arms 26. By thus varying the angle of the arm 33, the tension of the spring 31 may be varied, and consequently the pull of the spring against the attachment frame may be varied.

Instead of passing the cable 28 over a pulley as has been done in the past, I provide the pulley sector 38, pivoted at 39 between the arms of a fork 40 formed on the bracket 32. The fork 40 serves to support the sector against lateral movement as well as serving as a fulcrum therefor.

The pulley sector 38 has a peripheral groove 41 which receives the cable 28, and a set-screw 42, located substantially intermediate the ends of the sector, serves to clamp the cable in place. The reason for clamping the cable intermediate the ends of the sector, lies in the fact that as the sector rotates, one end or the other of the cable will leave the groove 41.

The set-screw 42 is threaded through a swinging yoke 43 pivoted at 44 to the pulley sector.

The radius 45 of the sector is considerably smaller than the radius 46 thereof whereby the lift produced upon the attachment frame is greater than the depression of the foot lever 14. This is thought to be obvious from a consideration of the structure shown in the drawings.

It will now be seen that the arrangement is such that the entire attachment may be secured directly to the cross-member 17 of the planter frame. The only adjustment which is necessary is an adjustment of the length of the cable portion extending between the pulley sector and the foot lever 14.

In operation, the disc 21, as it travels on the ground serves to prevent side-slipping of the planter, being securely placed between the truss-like formation of the arms 23, 26. When it is desired to make a turn, the foot lever 14 is depressed to raise the disc from the ground.

The disc offers very little resistance to forward travel of the planter due to its sharp edge and its rolling action.

Some changes may be made in the construction arrangement of the parts of my invention without departing from the real spirit and purpose of my invention, and it is my intention to cover by my claims any modified forms of structure or use of mechanical equivalents, which may be reasonably included within their scope.

I claim as my invention:

1. An anti-side slipping attachment for an agricultural machine having relatively movable portions, an adjusting device connecting said relatively movable portions, and a rear transverse frame member, comprising a bracket attachable to said rear transverse frame member and projecting upwardly, an attachable frame provided with means for pivotal attachment to said rear transverse frame member, a rolling disc carried by said attachment frame, a lever extending beneath said transverse frame member and fulcrumed relative to the pivotal axis of the attachment frame, a spring attached to the forward end of said lever and to said bracket at a distance above the forward end of said lever, and adjustable means linking the rear end of the lever to the attachment frame and capable of varying the angle of said lever relative to the attachment frame.

2. An anti-side slipping attachment for an agricultural machine having relatively movable portions, an adjusting device connecting said relatively movable portions, and a rear transverse frame member, comprising a bracket attachable to said rear transverse frame member and projecting upwardly, an attachable frame provided with means for pivotal attachment to said rear transverse frame member, a rolling disc carried by said attachment frame, a lever extending beneath said transverse frame member and fulcrumed relative to the pivotal axis of the attachment frame, a spring attached to the forward end of said lever and to said bracket at a distance above the forward end of said lever, and a connection between the other end of the lever and the attachment frame.

3. In combination with an agricultural machine including sections vertically adjustable relative to each other, and means for adjusting said sections comprising an attachment frame hinged to one of the sections and projecting rearwardly, a lever fulcrumed near the hinge axis of the attachment frame, means adjustably connecting one end of the lever to the attachment frame whereby the angle of the lever may be varied relative to the attachment frame, a rolling disc journalled in the attachment frame and a spring attached to the other end of said lever and secured at a height above the axis of the attachment frame, serving to urge the attachment frame downwardly.

4. In combination with an agricultural machine including sections movable relative to each other and including means for adjusting said sections relative to each other, an attachment frame hinged to one of said sections on a horizontal axis, a rolling disc journalled in said attachment frame, resilient means to urge the attachment frame downwardly, and means for raising the attachment frame comprising a pulley sector of variable radius pivoted relative to the sections to which the attachment frame is hinged, and a cable extending over said sector, attached at one end to the attachment frame and at its other end to said means for adjusting, the longer portion of said pulley sector being adapted to cooperate with that portion of the cable which extends to the attachment frame.

5. In combination with an agricultural machine including sections movable relative to each other and including means for adjusting said sections relative to each other, an attachment frame hinged to one of said sections on a horizontal axis, a rolling disc journalled in said attachment frame, resilient means to urge the attachment frame downwardly, and means for raising the attachment frame comprising a pulley sector of variable radius pivoted relative to the section to which the attachment frame is hinged, and a cable extending over and attached to said pulley sector, intermediate the ends of the latter, said cable being at one end attached to the attachment fame and at its other end to said means for adjusting, the longer portion of said pulley sector being adapted to cooperate with that portion of the cable which extends to the attachment frame.

6. An attachment for an agricultural machine of the type having two relatively movable sections, means for adjusting said sections relative to each other and a rear transverse frame member embodied in one of said sections comprising a bracket attachable to said rear transverse member to extend upwardly therefrom, an attachment frame, means for hinging said attachment frame to said transverse frame member on a horizontal axis, a lever attached to the attachment frame and projecting beyond the hinge axis thereof, a spring attached between the end of said lever and the bracket, a pulley device pivoted on the bracket, and a cable attached at one end to the attachment frame, extending over the pulley device, and attached to its other end to said means for adjusting.

7. An attachment for an agricultural machine of the type having two relatively movable sections, means for adjusting said sections relative to each other and a rear transverse frame member embodied in one of said sections comprising a bracket attachable to said rear transverse member to extend upwardly therefrom, an attachment frame, means for hinging said attachment frame to said transverse frame member on a horizontal axis, a lever attached to the attachment frame and projecting beyond the hinge axis thereof, a spring attached between the end of said lever and the bracket, a pulley sector pivoted on said bracket, and a cable extending over said pulley sector, attached at one end to the attachment frame and at its other end to the means for raising, said pulley sector having a greater radius on that side which engages the portion of the cable extending to the attachment frame than on that side which engages the cable portion extending to the means for adjusting.

Signed this 11th day of October, 1930, at Sioux City, Iowa.

CHRIST O. PETERSEN.